United States Patent
Hamasaki et al.

(10) Patent No.: US 6,269,227 B1
(45) Date of Patent: *Jul. 31, 2001

(54) LENS HOOD

(75) Inventors: Takuji Hamasaki; Hiroaki Suzuki; Makoto Iikawa, all of Saitama; Kazunori Ishizuka, Kanagawa; Kazuhiro Hattori, Chiba, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,615

(22) Filed: Apr. 20, 2000

(30) Foreign Application Priority Data

May 27, 1999 (JP) .................................................. 11-148393

(51) Int. Cl.[7] .................................................. G03B 11/04
(52) U.S. Cl. ........................................... 396/534; 396/544
(58) Field of Search ..................................... 396/534, 544, 396/545

(56) References Cited

U.S. PATENT DOCUMENTS

| | | | |
|---|---|---|---|
| 4,909,617 | * | 3/1990 | Boyd ..................................... 396/534 |
| 5,105,312 | * | 4/1992 | Tiffen et al. .......................... 396/544 |
| 5,313,329 |   | 5/1994 | Ueda . |
| 5,327,188 | * | 7/1994 | Kohomoto ........................... 396/534 |
| 6,104,887 | * | 8/2000 | Hamasaki et al. ................... 396/534 |

* cited by examiner

Primary Examiner—David M. Gray
(74) Attorney, Agent, or Firm—Greenblum & Bernstein, P.L.C.

(57) ABSTRACT

A lid (40) with which an opening (35) in a lens hood (30) is made open or closed is rotatably supported by a hinge pin (47) that is supported at both ends on pin support portions (37) of the lens hood (30) and which is passed through pin insertion holes (44). When the lid (40) closes the opening (35), retainer lugs (42) of the lid (40) retain stoppers (36) of the lens hood (30) to keep the opening (35) closed. If the stoppers (36) are removed from the constraint by the retainer lugs (42) and the lid (40) is turned about the hinge pin (47) under the urging force exerted by the spring (48), the lid (40) is brought to a state where it makes the opening 35 open.

17 Claims, 16 Drawing Sheets

FIG. 7(a)
FIG. 7(b)
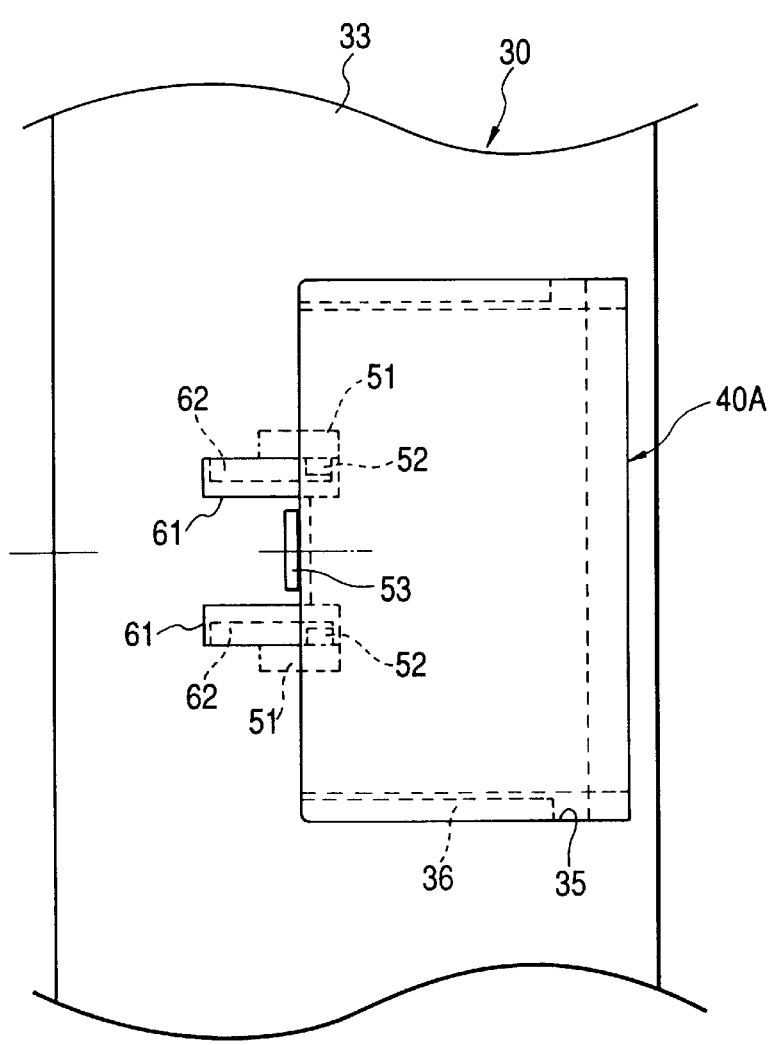
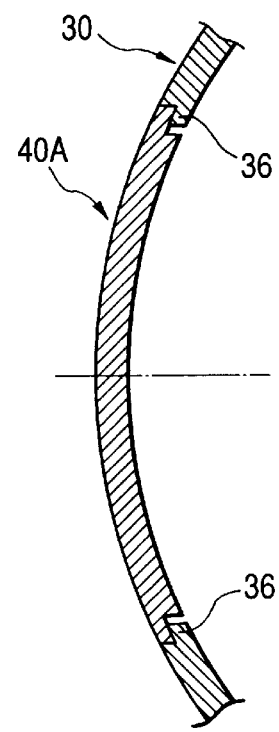

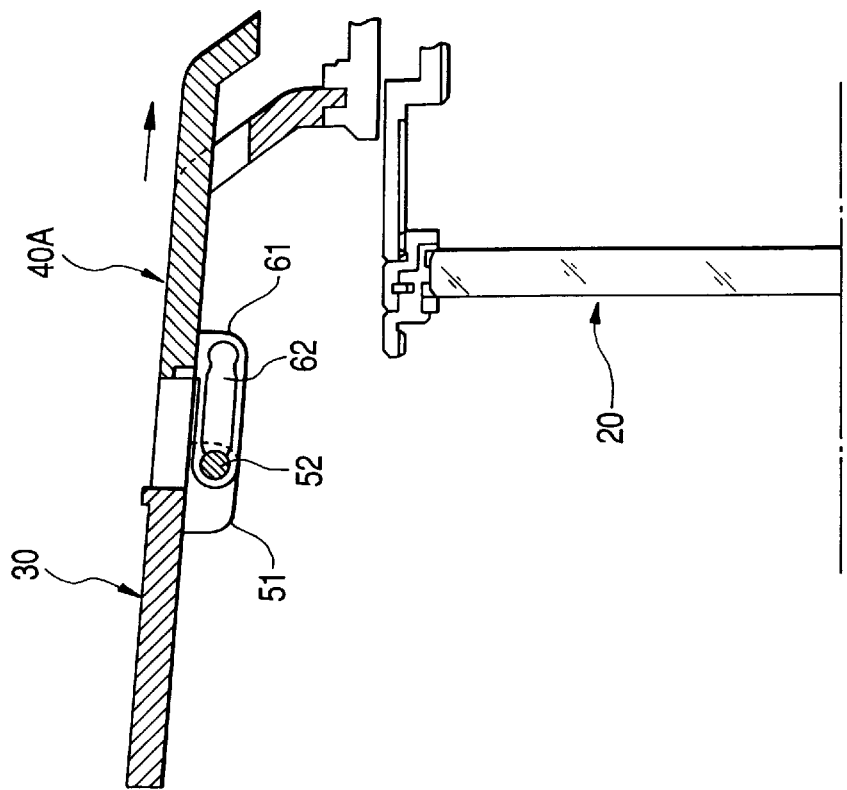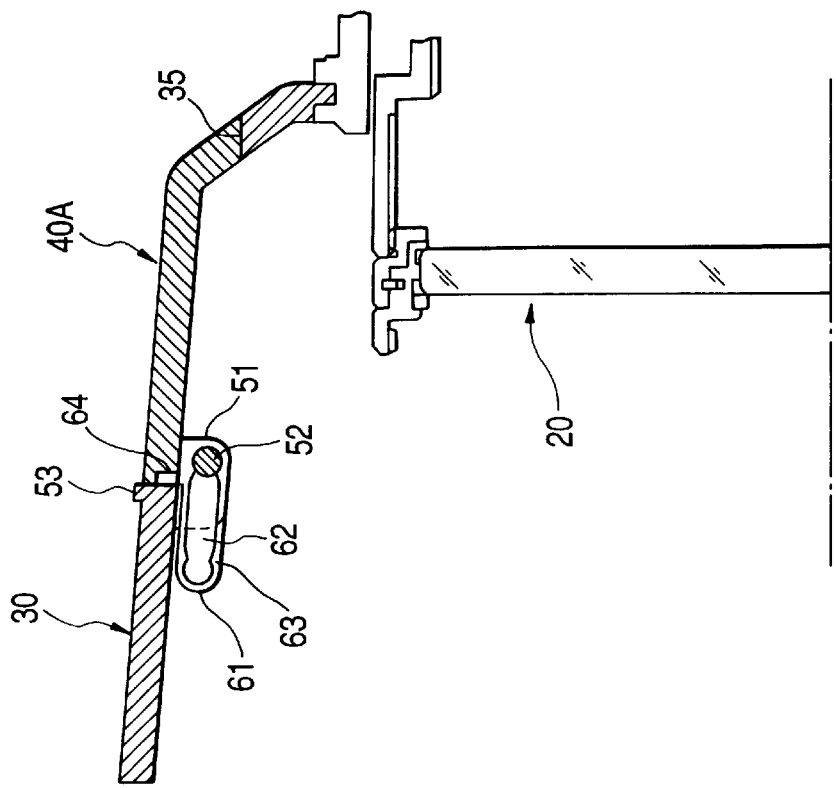

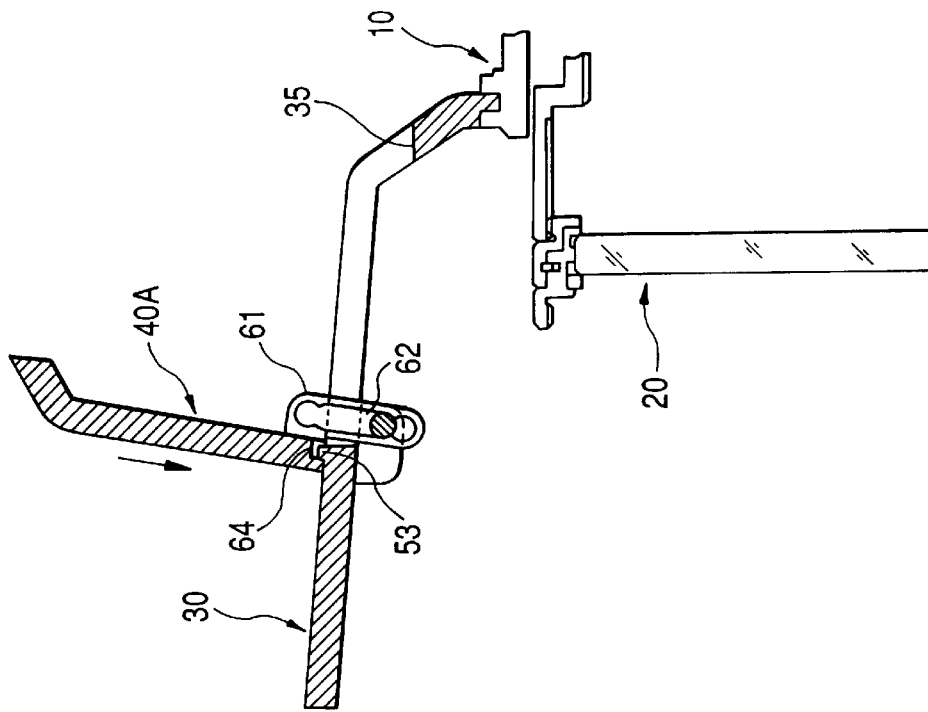
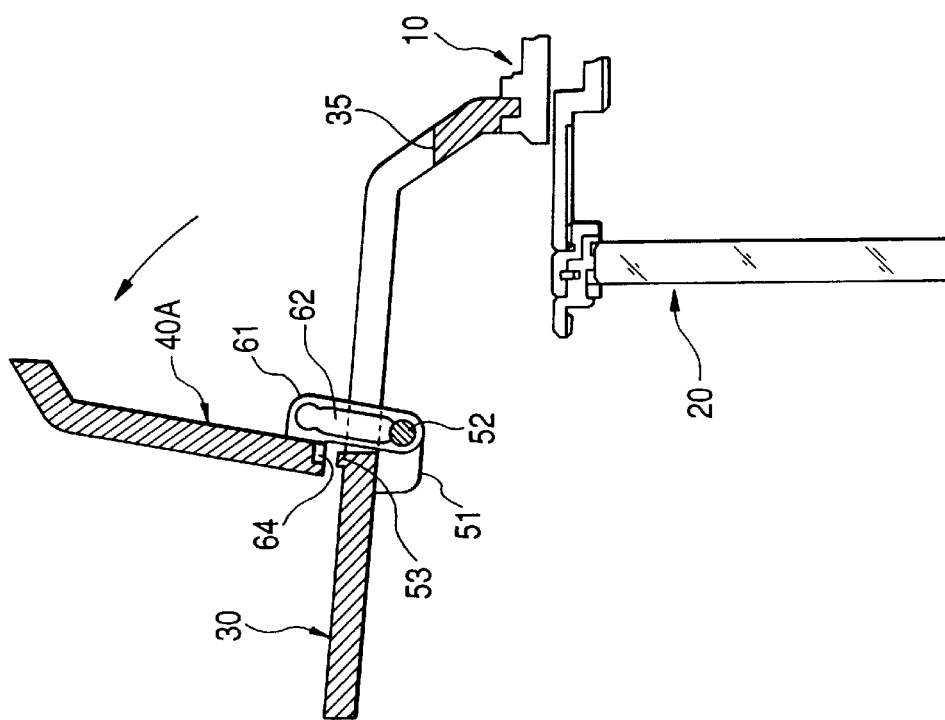

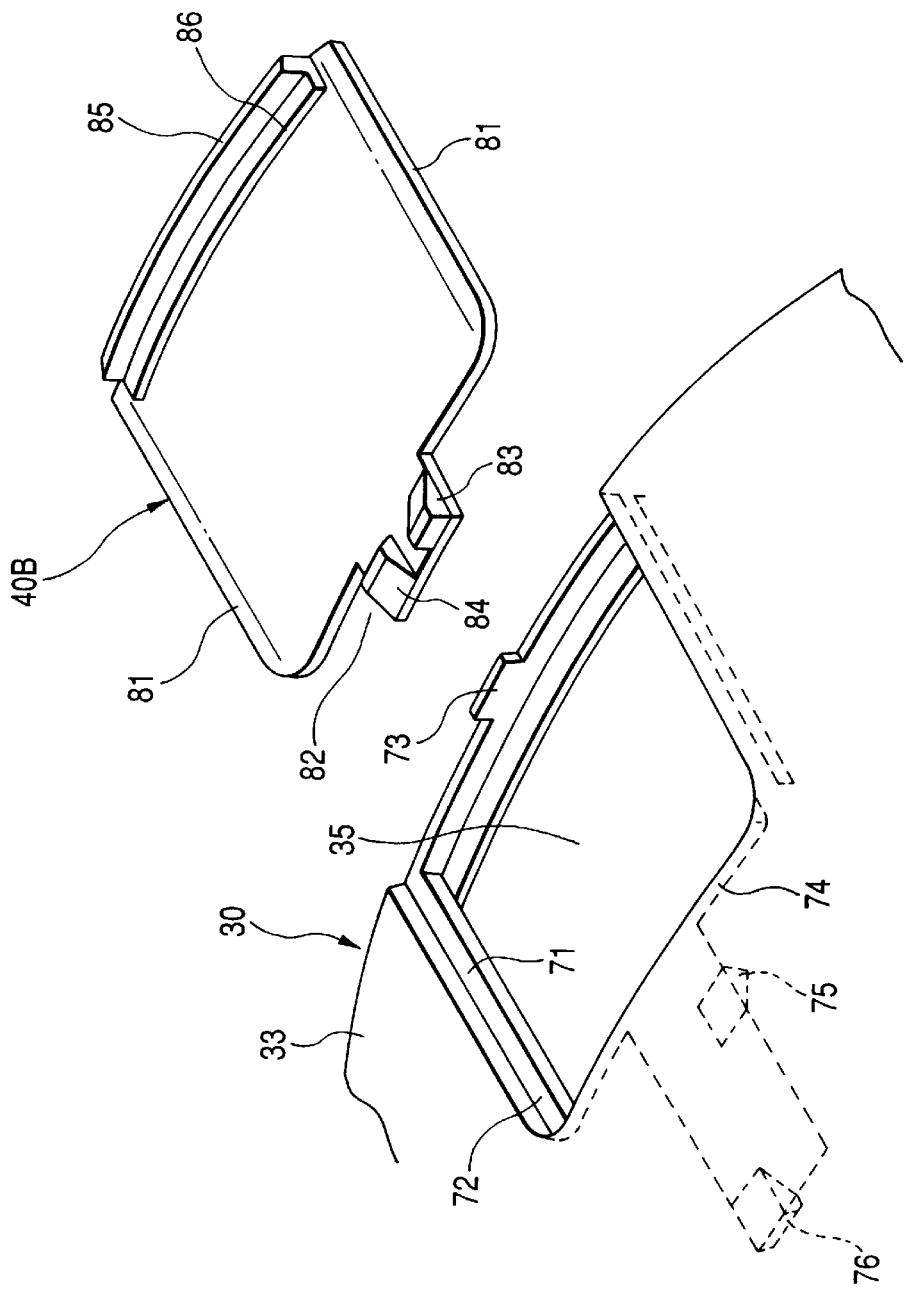

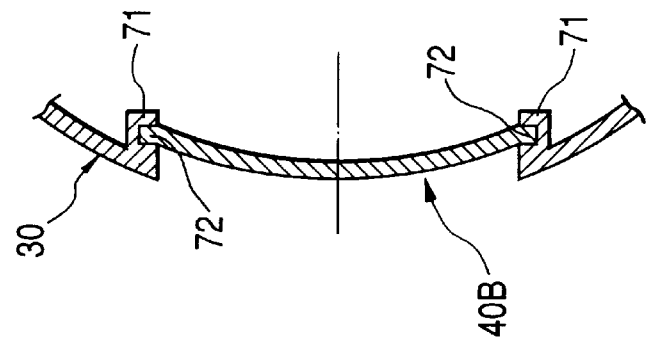
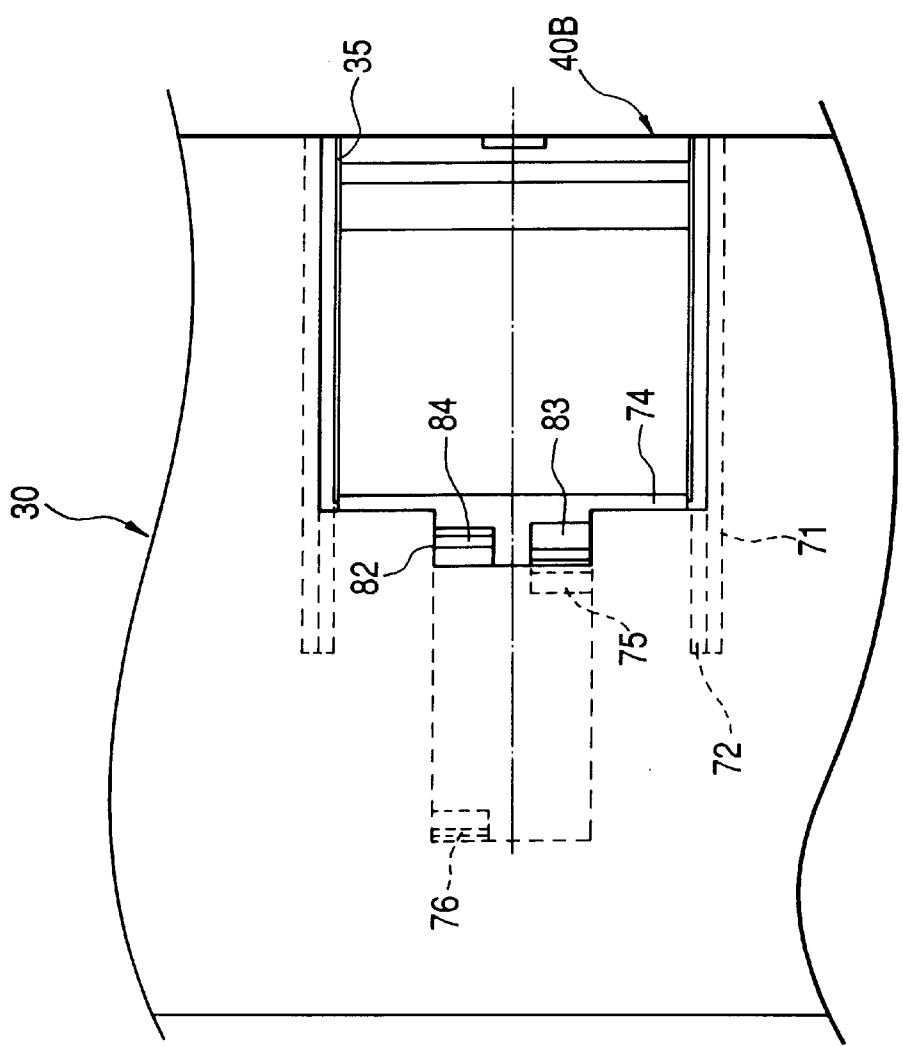

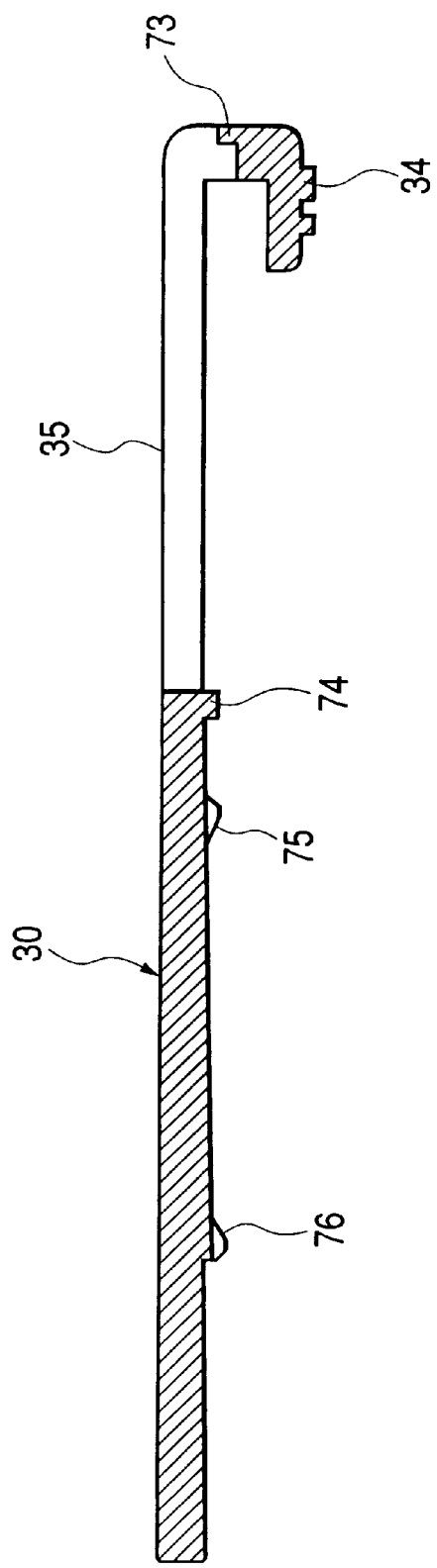
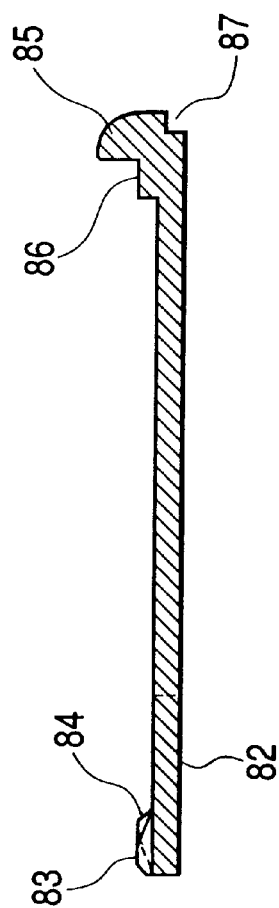
FIG. 12(a)
FIG. 12(b)

LENS HOOD

BACKGROUND OF THE INVENTION

The present invention relates to a lens hood, particularly to a lens hood suitable for use on camera lenses.

Camera lenses are usually supplied with a lens hood for shielding rays of light coming from outside the picture area, or outside the angle of view of the lens, and it is mounted at the front end of the lens barrel. In order to enhance the photographic effect of a camera lens, it is also common practice to mount a polarizing filter, crossed filters and various other filters at the front end of the lens barrel. In the case of a polarizing filter, the position of its rotation about the optical axis is changed to limit the amount of polarized light from the subject so as to produce a sharper picture. In the case of crossed filters, the position of their rotation about the optical axis is changed to alter the direction of a blurred cross. These filters that create varying photographic effects by changing the direction of rotation about the optical axis are hereunder referred to as "rotatory effect filters". If they are used on a single-lens reflex camera, their effectiveness can be confirmed by looking through a viewfinder and, therefore, the aforementioned lens hood which is to be mounted at the front end of the lens barrel is so adapted that pictures can be taken with the lens hood attached to the lens barrel and as those filters are rotated.

FIG. 15 is a partial section of the lens hood used in combination with a polarizing filter as a rotatory effect filter. The polarizing filter generally indicated by 20 comprises a movable frame 22 that supports the rim of a disk-shaped optical filter glass 24 and a fixed frame 21 which supports said movable frame 22 in such a way that it can rotate about the optical axis. Said fixed frame 21 has a male thread 23 formed on the outer periphery and by bringing it into engagement with a female thread 11 formed on the inner periphery at the front end of a lens mount 10, the fixed frame 21 can be fitted on the lens mount 10. Once the fixed frame 21 has been fitted, the movable frame 22 can be rotated relative to said fixed frame 21 so that the rotation of the polarizing filter 20 about the optical axis is adjustable to a desired position. A lens hood 30A is fitted around the front end of the lens mount 10 and it may be of a bayonet type.

In order to ensure that the rotatory effect filter, which is the polarizing filter 20 in the case under consideration, can be rotated with the lens hood 30A fitted on the lens mount 10, the lens hood 30A is formed to have a sufficiently larger outside diameter than the lens mount 10 that a wide enough space to permit the passage of fingertips of a photographer is formed around the polarizing filter 20. When taking pictures with the polarizing filter 20 fitted in the lens hood 30A, the photographer puts the finger into the lens hood 30A through the front opening and rotates the polarizing filter 20 relative to the lens mount 10 by manipulating the movable frame 22 with the finger.

A problem with the lens hood 30A is that while the photographer manipulates the polarizing filter 20 with one hand while looking at the subject through the viewfinder, the hand which has been put into the lens hood 30A through the front opening hides a portion of the lens mount 10 to cause occasional vignetting in the field of view and this is by no means desirable for the purpose of checking for the appropriateness of the picture area. As a further problem, in order to ensure the space through which the finger can be put into the lens hood 30A, its outside diameter is prone to be unduly larger than that of the lens mount but this is not desirable from portability and design viewpoints.

To solve this problem, the idea shown in FIG. 16 was proposed; an opening 35 or a hole through which a photographer's finger can be put into a lens hood 30B is made in a selected area of the lens hood 30B and the photographer manipulates a polarizing filter 20 by rotating it via the opening. With this lens hood 30B, there is no need to provide a space around the polarizing filter 20 into which the finger can be put and this not only reduces the outside diameter of the lens hood 30B but also prevents the field of view through the viewfinder from being blocked by the photographer s hand with which the polarizing filter 20 is being adjusted. On the other hand, however, when the photographer removes the finger out of the lens hood 30B and performs the actual shooting by, for example, releasing the shutter, rays outside the angle of view will get into the lens mount 10 through the opening 35 and the intended function of the lens hood is not fulfilled.

SUMMARY OF THE INVENTION

An object, therefore, of the present invention is to provide a lens hood that is reduced in outside diameter while allowing for easy manipulation when adjusting a polarizing filter and other components mounted on the lens barrel and which yet can perform its intended function to the fullest extent.

To attain this object, the present invention provides a lens hood to be fitted on a lens mount of a camera in such a way as to surround the front end of the lens barrel, said lens hood having an opening made in at least a portion of its peripheral surface to help manipulate the component mounted at the front end of said lens barrel and a lid for closing said opening, said lid being formed as a separate entity from said lens hood and retained on said lens hood such that it is movable between one position and another relative to said lens hood, said lid being so adapted that it closes said opening when it has moved to said one position while making said opening open when it has moved to said another position.

In a preferred embodiment of the invention, said lid is linked to said lens hood by means of a hinge structure that causes said lid to turn radially of said lens hood and said lid makes said opening open when it has been turned radially outward while closing said opening when it has been turned in a direction parallel to the peripheral surface of said lens hood. In a first preferred embodiment of the invention, said hinge structure comprises a shaft element for providing a hinge link between said lid and said lens hood and an elastic means for-urging said lid toward a direction in which it opens, said lid and said lens hood being supplied with a retainer means for keeping said lid in said closed state. In a second preferred embodiment of the invention, said hinge structure is composed of a pin shaft provided on either said lid or said lens hood and pin shaft receptacles provided on said lens hood or said lid, said lid and said lens hood being provided with engagement means for engaging said lid in said open state and said closed state, respectively. In a third preferred embodiment of the invention, said lid is retained by rail structures capable of movement relative to said lens hood along the axis of the tube of said lens hood, and said lid, when it has moved to said one position, is in a position that closes said opening and, when it has moved to said another position, it is in a position adjacent said opening in the axial direction of the tube of said hood to make said opening open.

The lens hood of the invention has an opening through which the photographer's finger is put into the lens hood to enable adjustment of a polarizing filter and other components mounted on the lens barrel. When there is no need to adjust the polarizing filter or any other component on the lens barrel, the opening is closed with the lid to prevent rays outside the angle of view from getting into the lens barrel, thereby ensuring the intended shielding effect of the lens hood. Even when the lid is in a non-closing position, it is retained on the lens hood and there is no possibility of losing it. Note that the lid might be lost if it is of such a type that it has to be detached from the lens hood to make the opening open. In the present invention, the lid may be so designed that it turns radially of the lens hood to either close the opening or make it open; alternatively, the lid may be so designed that it moves along the axis of the lens mount to either close the opening or make it open; according to either design, the photographer need use only one finger to manipulate the lid for opening or closing it. If the lid is formed as a ring that is moved along the circumference of the lens hood to make the opening open, the applied circumferential force occasionally causes the lens hood to move together with the lid, creating a force toward a direction in which the lens hood is removed from the lens barrel with the result that it is no longer securely fitted but comes loose.

The present disclosure relates to the subject matter contained in Japanese patent application No. Hei. 11-148393 (filed on May 27, 1999), which is expressly incorporated herein by reference in its entirety.

BRIEF DESCRIPTION OF THE DRAWINGS

FIG. 7a is a plan view showing the essential parts of the lens hood according to the second embodiment;

FIG. 7b is a cross section of the essential parts taken in a circumferential direction;

FIGS. 8a and 8b are longitudinal sections for illustrating the first two steps in the process of closing the lid and making it open in the lens hood according to the second embodiment;

FIGS. 9a and 9b are longitudinal sections for illustrating the last two steps in the same process;

FIG. 10 is a perspective view showing the essential parts of a lens hood according to the third embodiment of the invention;

FIG. 11a is a plan view showing the essential parts of the lens hood according to the third embodiment;

FIG. 11b is a cross section of the essential parts taken in a circumferential direction;

FIG. 12a is a longitudinal section of the lens hood according to the third embodiment;

FIG. 12b is a longitudinal section of the lid on the same lens hood;

DESCRIPTION OF THE PREFERRED EMBODIMENT

Figure 1:
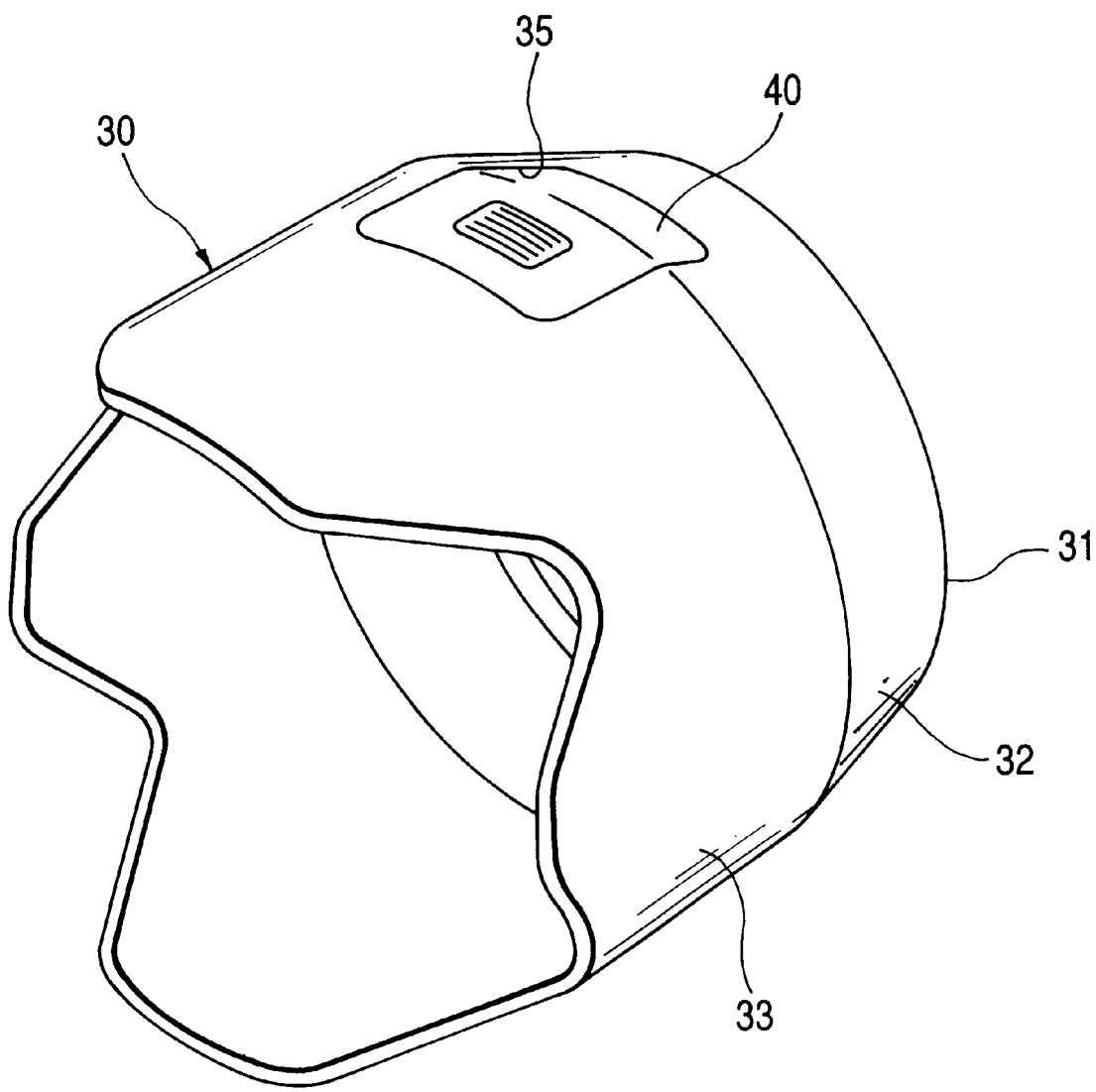
FIG. 1 is a perspective view showing the exterior appearance of a lens hood according to the first embodiment of the invention.

Embodiments of the present invention are described below with reference to accompanying drawings. FIG. 1 is a perspective view showing the exterior appearance of a lens hood according to the first embodiment of the invention. The lens hood is generally indicated by 30 and as will be described later, it is so adapted that it can be fitted on the lens mount of a camera. The lens hood 30 is generally of a cylindrical shape that consists of a basal end portion 31 the inside diameter of which is generally equal to the outside diameter of the lens mount and a tapered conical portion 32 that progressively increases in diameter toward a distal end portion 33 having a slightly larger diameter than the outside diameter of the lens mount. The rim of the most distal end of the lens hood 30 has a curved shape that matches the angle of view provided by the lens mount. A rectangular opening 35 spanning the tapered portion 32 and the distal end portion 33 is formed in a selected area of the circumference of the lens hood 30 which, in the case under consideration, is located at the top peripheral site. The opening 35 is closed with a lid 40. Needless to say, the opening 35 is of such a dimension that a photographer can put his finger into the lens hood 30 and cause a polarizing filter or some other component on the lens barrel to move slightly about its axis.

Figure 2:
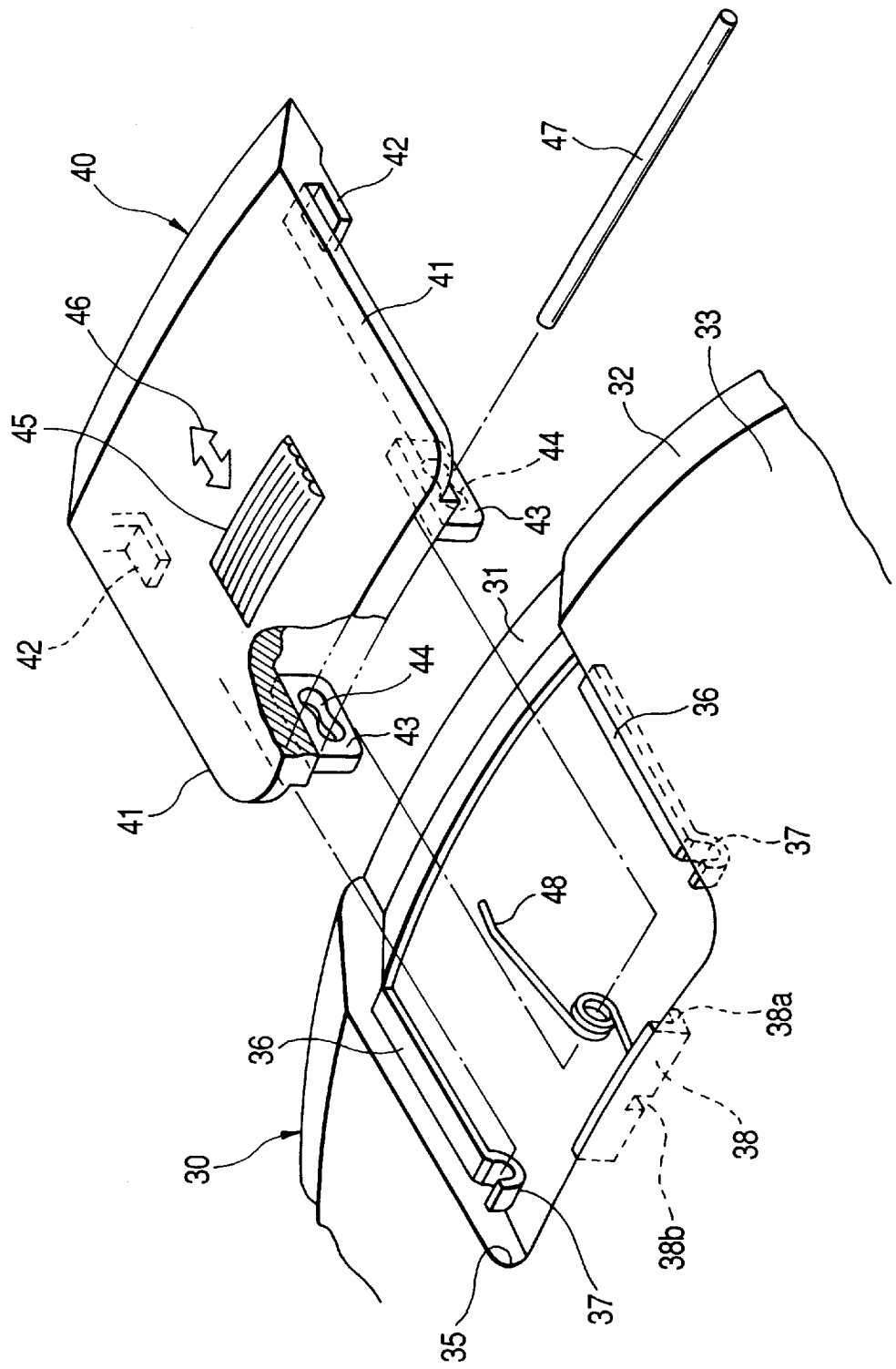
FIG. 2 is a perspective view showing the essential parts of the lens hood according to the first embodiment.
Figure 3A:
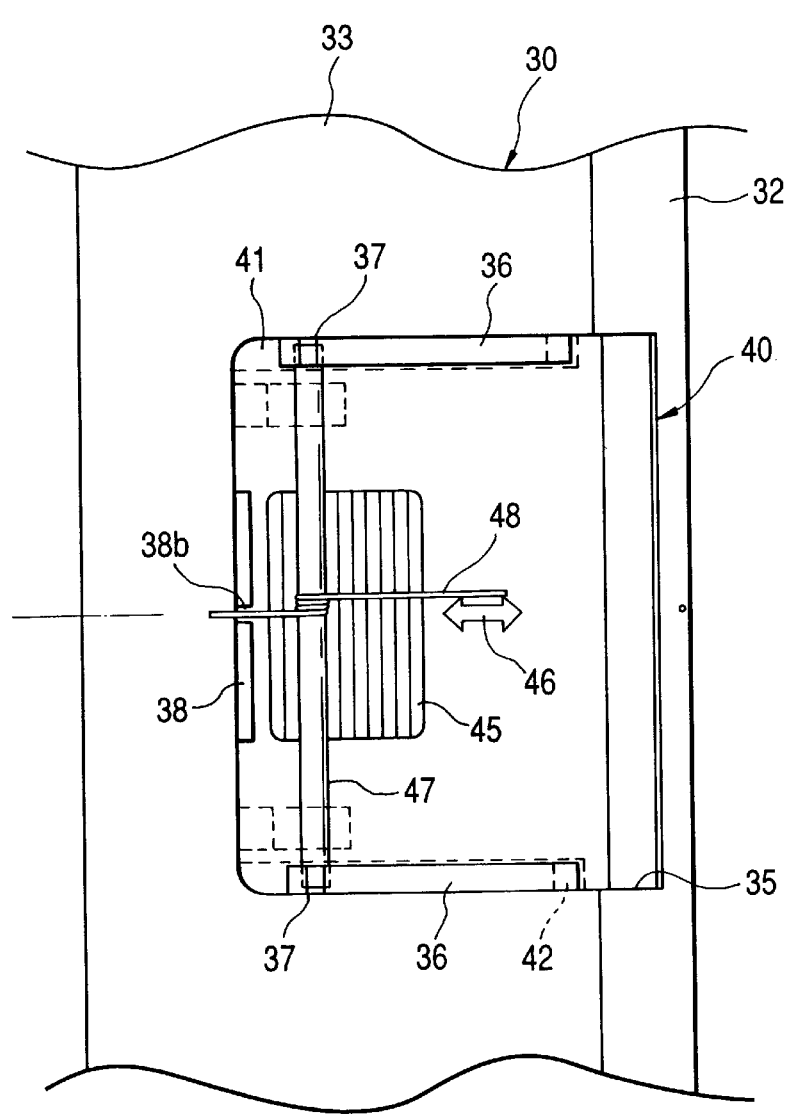
FIG. 3a is a plan view showing the essential parts of the lens hood according to the first embodiment.
Figure 3B:
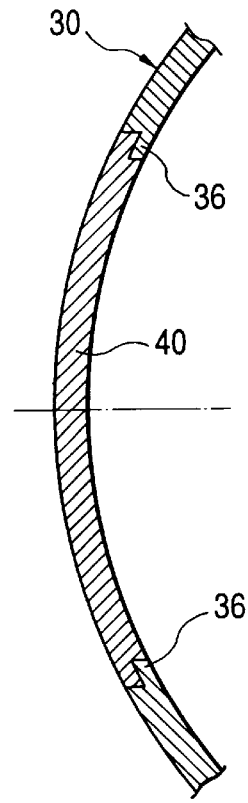
FIG. 3b is a cross section of the essential parts taken in a circumferential direction.
Figure 4:
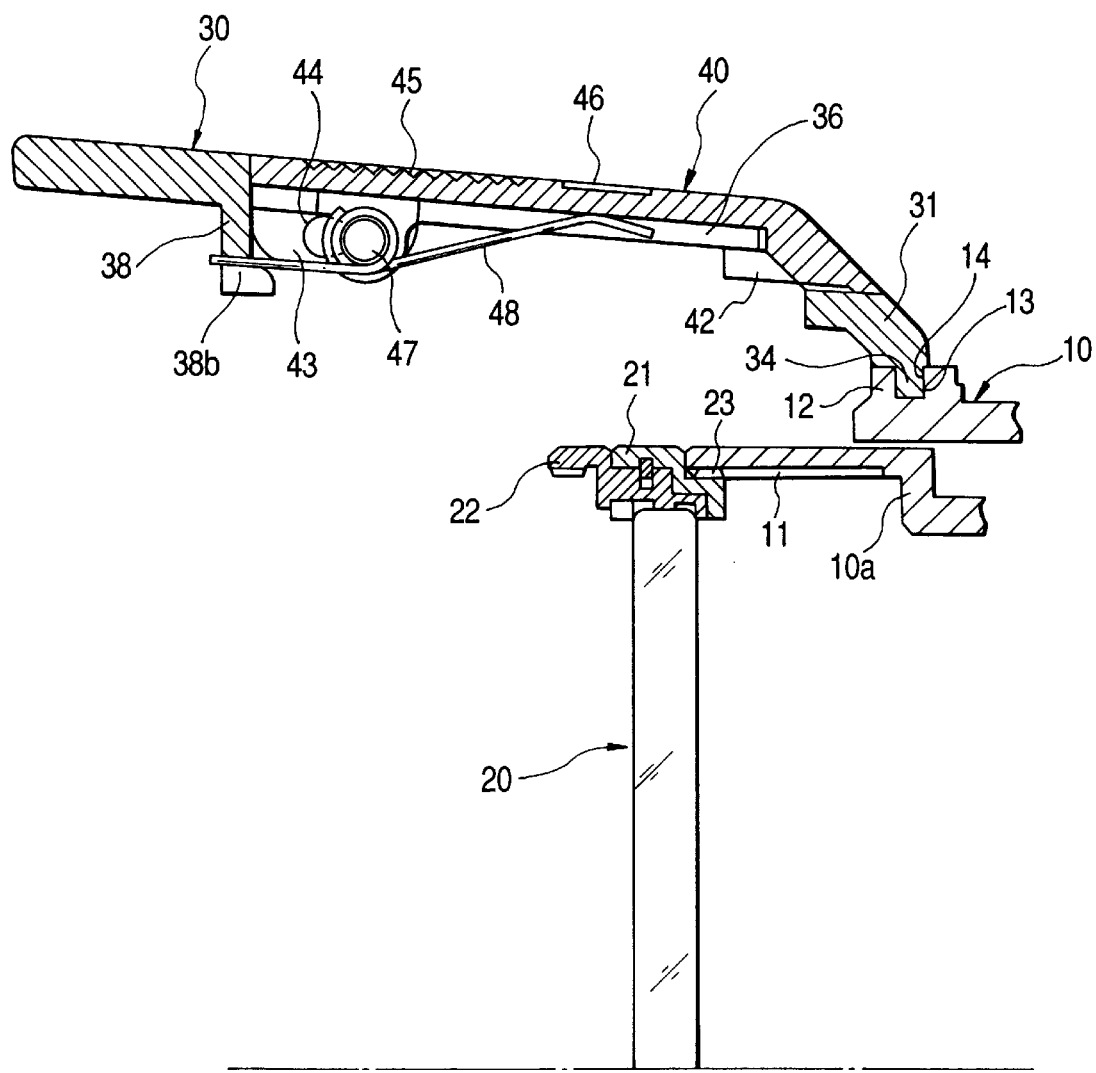
FIG. 4 is a longitudinal section of the lens hood according to the first embodiment, with the opening closed.

FIG. 2 is a perspective view showing the opening 35 in the lens hood 30 before it is fitted with the lid 40. FIG. 3a is a plan view exposing the parts hidden under the lid 40, and FIG. 3b is a partial cross section of the lens hood 30 fitted with the lid 40 and which is taken along its circumference. FIG. 4 is a longitudinal section of the lens hood 30 fitted with the lid 40. The opening 35 has two parallel side edges that extend along the optical axis and a rail of stopper 36 is formed along each of said side edge on the inner surface; the stopper 36 is thinner than the wall thickness of the lens hood 30 and extends from the basal end portion of the opening 35 to a position near its distal end. The distal end of each stopper 36 is formed as a cylindrical pin support portion 37, with its circumference being partly removed. In the two pin support portions 37, the opposite ends of a hinge pin 47 (to be described later) are fitted in position. The edge at the distal end of the opening 35 has a spring support wall 38 that projects radially inward and which has a positioning area 38a with its distal end projecting toward the basal end portion of the lens hood 30. A radial slit 38b is formed in the center of the spring support wall 38 in its circumferential direction so that an end portion of a spring 48 (to be described later) is supported in the slit 38.

The lid 40 is formed as a generally rectangular plate having an arcuate cross section that is large enough to compensate for those parts of the circumferences of the distal end portion 33 and the tapered portion 32 of the lens hood 30 which have been removed by forming the opening 35. The two parallel sides of the lid 40 have thin-walled areas 41 that extend from the distal end to the neighborhood of the basal end and which are to contact the pair of stoppers 36 in the opening 35. The lid 40 has two retainer lugs 42 on opposite sides of the basal end for holding the basal ends of the stoppers 36 in the direction of their thickness. The distal end portion of the lid 40 has pin support lugs 43 as integral parts of the inner surface which are directed inwardly from the inside of the pin support portions 37 of the stoppers 36 to the corresponding positions. Each of the pin support lugs 43 has a peanut-shaped hole 44 through which a hinge pin 47 to be described later can be passed. To assist its manipulation, the lid 40 has a knurled area 45 on the outer surface that comprises a plurality of triangular ridges and, adjacent to the knurled area 45, a two-headed arrow 46 is stamped in the surface of the lid 40 that extends along the axis of the lens barrel to indicate the directions in which the lid 40 is to be fitted and removed.

The lid 40 is mounted on the lens hood 30 by means of a hinge pin 47 having a circular cross section and a torsion spring 48. Both ends of the hinge pin 47 are supported by the pin support portions 37 in the opening 35 and, in their supported state, they are passed through the holes 44 in the pin support lugs 43 on the lid 40. The coil of the spring 48 that has been formed by torsion is slipped over the hinge pin 47; an end of the spring 48 is placed in contact with the slit 38b in the spring support wall 38 of the opening 35 while the other end is in contact with the inner surface of the lid 40. As a result, the lid 40 is capable of turning about the hinge pin 47 relative to the opening 35 while, at the same time, the spring 48 gives an urging force that renders the opening 35 open.

As FIG. 4 shows, the lens mount 10 of a single-lens reflex camera has a female thread 11 formed in the inner surface at the distal end of the inner barrel 10a and a male thread 23 formed on the outer periphery of a fixed frame 21 of a rotatory effect filter, say, a polarizing filter 20 which combines with a movable frame 22. The female and male threads engage each other to mount the filter 20 in the lens barrel 10. As in the prior art, a photographer manipulates the movable frame 20 with the finger to adjust the rotation of the polarizing filter 20 about the optical axis so that it can assume any desired position relative to the lens mount 10. The distal end of the lens mount 10 has a pair of annular walls 12 and 13 formed side by side in the direction of the optical axis and these two walls define an annular bayonet groove 14. The basal end portion 31 of the lens hood 30 has a bayonet wall 34 formed in such a way that it can engage the bayonet groove 14 in the lens mount 10. After mounting the lens hood 30 from the distal end of the lens barrel 10 and with the bayonet wall 34 being placed into engagement with the bayonet groove 14, the photographer turns the lens hood 30 about the optical axis by a predetermined angle, whereupon the bayonet wall 34 cooperates with the bayonet groove 14 to have the lens hood 30 fitted on the lens barrel 10.

As shown in FIG. 4, the lid 40 in its normal state is fitted in the opening 35 in the lens hood 30 to close it. To state more specifically, the inner surfaces of the thin-walled areas of the lid 40 are brought into contact with the top surfaces of the stoppers 36 and the basal end of each stopper 36 is held between the inner surface of the lid 40 and the corresponding retainer lug 42. As a result, the lid 40 is kept fitted on the lens hood 30. Although the spring 48 gives the lid 40 an urging force that makes the opening 35 open, the stoppers 36 being retained by the retainer lugs 42 prevent the lid 40 from being opened and the opening 35 is kept closed. The pin insertion hole 44 is peanut-shaped and the hinge 47 is passed through that part of the hole which is closer to the basal end. Needless to say, the lid 40 when it has closed the opening 35 makes up for a part of the circumference of the lens hood 30.

Figure 5:
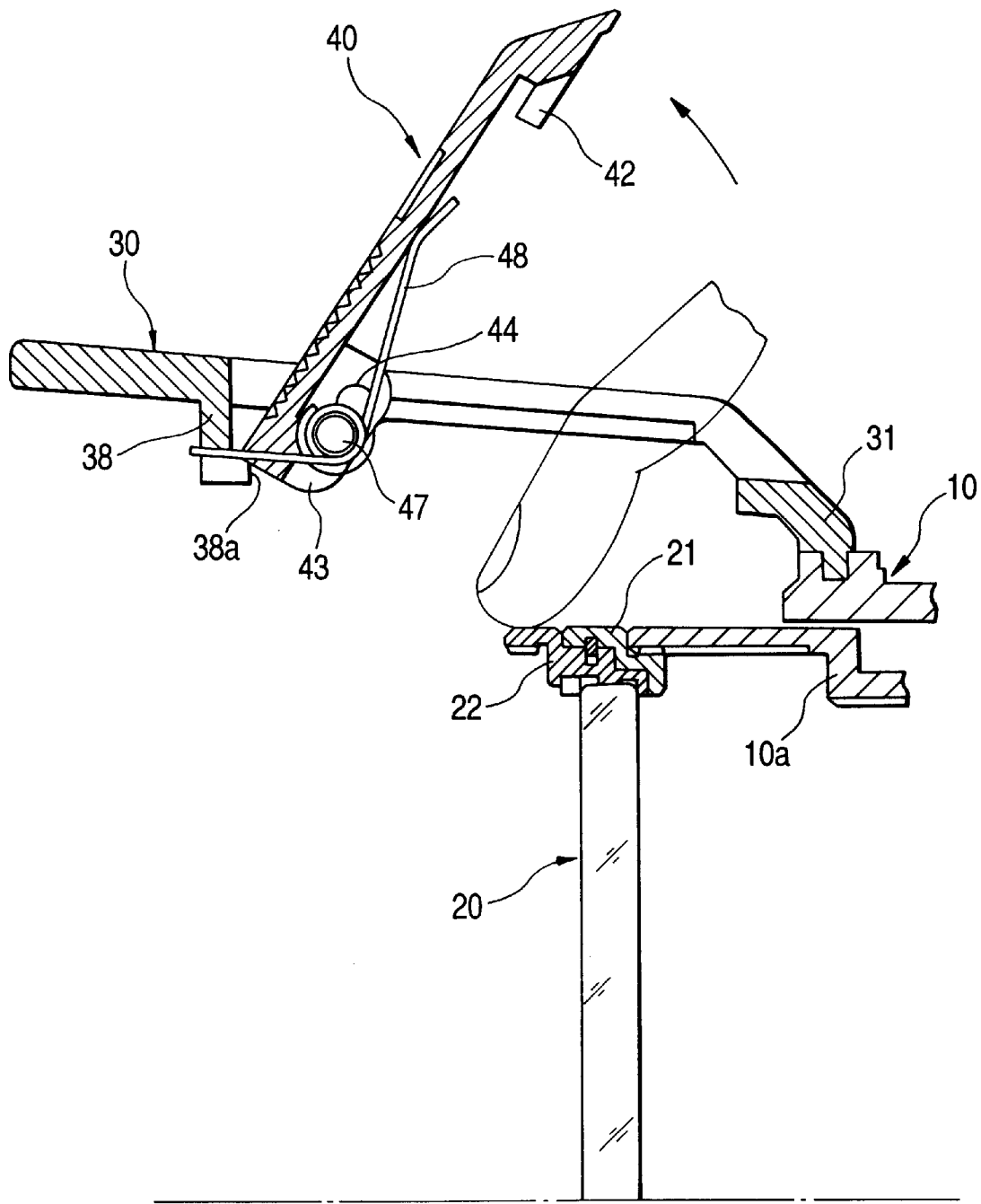
FIG. 5 is a longitudinal section of the same lens hood with the opening made open.

Suppose here that the photographer is taking a picture by turning the polarizing filter 20 on the lens mount 20 as it carries the lens hood 30. First, he brings his finger into contact with the knurled portion of the lid 40 and gives it a force acting toward the basal end of the lens hood 30, so that the hinge pin 47 moves into that part of each hole 44 which is closer to the distal end, whereupon the lid 40 is moved to the basal end of the lens hood 30 and the retainer lugs 42 are disengaged from the basal ends of the stoppers 36. Then, as shown in FIG. 5, the urging force of the spring 48 causes the lid 40 to turn counterclockwise about the hinge pin 47 until its distal end contacts the positioning part 38a of the spring support wall 38. As a result, the lid 40 renders the opening 35 open and the photographer can now put the finger into the lens hood 30 through the opening 35 and adjust the rotating position of the polarizing filter 20. After the adjustment, the photographer replaces the finger on the surface of the lid 40 and swings it to a position where it closes the opening 35; thereafter, he moves the lid 40 toward the distal end of the lens hood 30, whereupon the retainer lugs 42 hold the basal ends of the stoppers 36 and the closed state shown in FIG. 4 is restored. Subsequently, the photographer can take pictures with unwanted light being positively shielded by the lens hood 30.

As will be understood from the foregoing description, even after the lid 40 has been manipulated to make the opening 35 in the lens hood 30 open, the lid 40 remains linked to a portion of the lens hood 30 by means of the engagement between the hinge pin 47 and each of the pin support portions 37 and there is no possibility for the lid 40 to be lost upon coming off the lens hood 30. To open the lid 40, the photographer needs only to move it along the axis of the lens barrel; to close it, he needs only to press it radially inward and move it along the axis of the lens barrel. A single finger suffices to open and close the lid 40 and the manipulability of the lid 40 is enhanced. In addition, the lens hood receives no force in the circumferential direction and, hence, there is no possibility for the lens hood to come loose.

Figure 6:
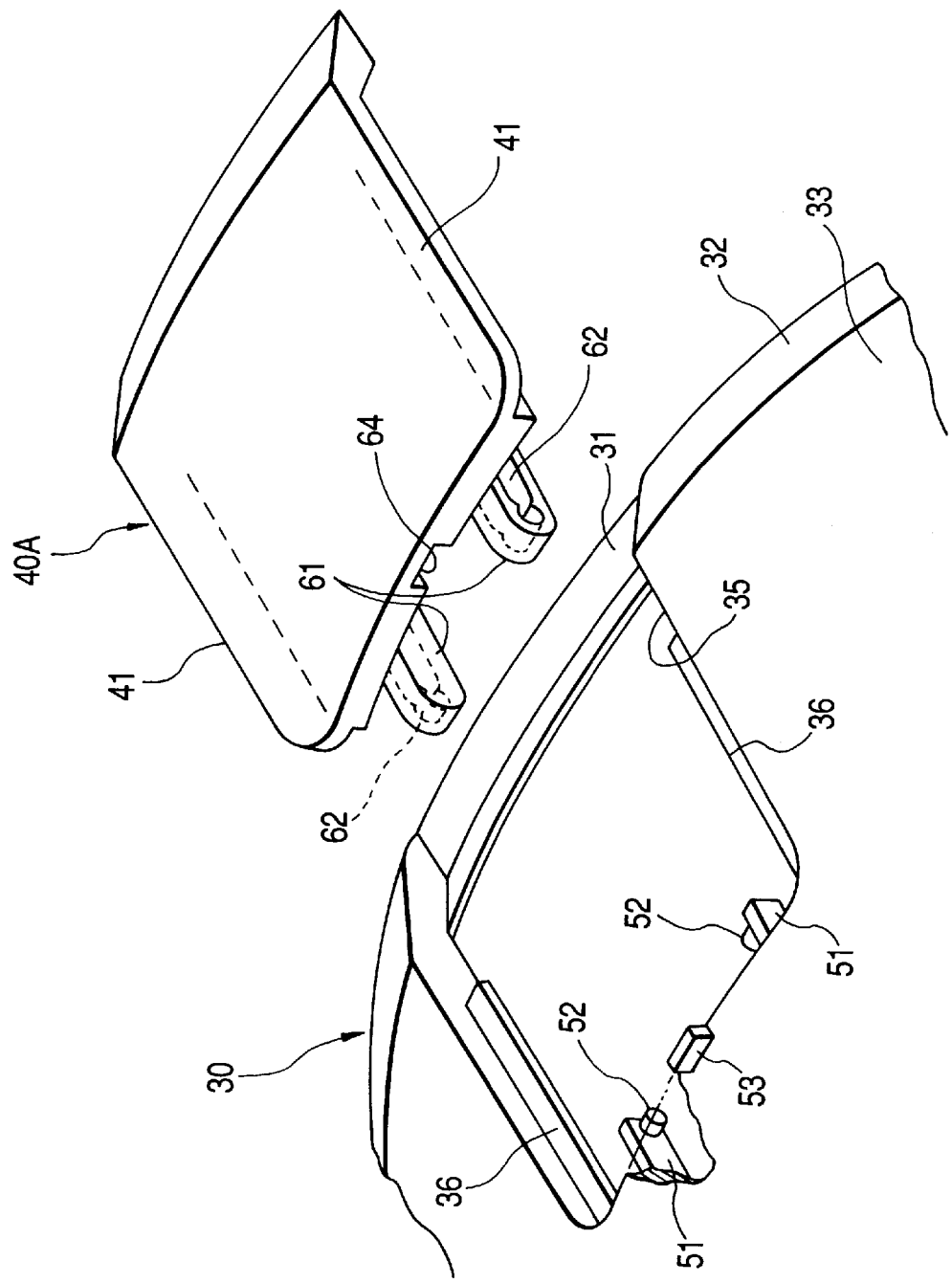
FIG. 6 is a perspective view showing the essential parts of a lens hood according to the second embodiment.

FIG. 6 is a perspective view of a lens hood according to the second embodiment of the invention before it is assembled. FIG. 7a is a plan view and FIG. 7b is a partial cross section of the lens hood 30 taken along its circumference. FIG. 8a is a longitudinal section of the lens hood 30 taken along the axis of the lens barrel. The second embodiment differs from the first embodiment in that the hinge pin and the spring are eliminated to reduce the number of parts. As shown, the stopper 36 described in the first embodiment is formed along each side edge of the opening 35 in the lens hood 30 but it has no pin support portions indicated by 37 in the first embodiment. The inner surface of the opening 35 at the distal end has a pair of pin shaft lugs 51 formed in such a way that they project toward the basal end of the lens hood 30. Each pin shaft lug 51 has a short, inwardly projecting pin shaft 52. The outer surface of the opening 35 at the distal end has an engaging projection 53 as an integral part that is formed in the center of its circumference.

As in the first embodiment, the lid indicated by 40A has the same shape and dimension as the opening 35 so that it can close the opening; in addition, it is curved to make up for a part of the circumference of the lens hood 30. On its inner surface at the distal end, the lid 40A has a pair of pin shaft receptacles 61 formed to project toward the distal end. Each pin shaft receptacle 61 has an elongated pin shaft receiving slot 62 formed in the surface of its outer side to extend from the distal end toward the basal end such that the pin shaft 52 provided on each of the pin shaft lugs 51 in the opening 35 can be fitted into the slot 62. Since each pin shaft receiving slot 62 has a constricted area 63 at both ends, the pin shaft 52 fitted into the slot can be moved with articulation along the slot. The distal end face of the lid 40A has an engagement groove 64 formed in the center of its circumference such that it can be brought into engagement with the projection 53 on the lens hood 30.

As shown in FIG. 8*a*, according to the second embodiment of the invention, the pair of pin shaft receiving lugs 61 on the lid 40A are placed between the pin shaft lugs 51 in the opening 35 and the pin shafts 52 are fitted into the corresponding pin shaft receiving slots 62. As a result, the lid 40A can turn about the pin shafts 52 in the pin shaft receiving slots 62 until the inner surfaces of the thin-walled areas 41 at opposite ends of the lid 40A contact the stoppers 36, whereupon the lid 40A closes the opening 35. In this state, the pin shafts 52 are located at the basal ends of the pin shaft receiving slots 62 and their positions are under constraint by the constricted areas 63. In addition, the distal ends of the pin shaft receiving lugs 61 are advanced to lie under the side of the lens hood 30 which is just adjacent to the distal end of the opening 35; as a result, the distal end face of the lid 40A contacts the distal end face of the opening 35 to prevent the lid 40A from turning toward the direction in which the opening 35 is rendered open.

To make the opening 35 open, the lid 40A is first moved toward the basal end of the lens hood 30 as shown in FIG. 8*b* until the pin shafts 52 are located at the distal ends of the pin shaft receiving slots 62, whereupon the distal end face of the lid 40A is no longer in contact with the distal end face of the opening 35 and the lid 40A is now ready to turn toward the direction in which the opening 35 is rendered open. Subsequently, as shown in FIG. 9*a*, the lid 40A is turned about the pin shafts 52 toward the direction in which the opening 35 is rendered open, whereupon the opening 35 becomes open. Thereafter, as shown in FIG. 9*b*, the open lid 40A is further turned to a position where it forms an angle of almost 90 degrees with the axis of the tube of the lens hood 30 and, at the same time, the lid 40A is moved radially inward by a small amount, whereupon the projection 53 comes into engagement with the groove 64, making it possible to keep the lid 40A in an open state. To close the opening 35 with the lid 40A, the procedure described may be reversed.

Thus, the advantages of the first embodiment are retained in the second embodiment. Even after the lid 40A has been manipulated to make the opening 35 in the lens hood 30 open, the lid 40A is partly linked to the lens hood 30 and there is no possibility to lose the lid 40A. To open the lid 40A, the photographer needs only to move it along the axis of the lens barrel, then move it radially; to close it, the order is reversed and he needs only to press the lid 40A radially and move it along the axis of the lens barrel. A single finger suffices to open and close the lid 40 and the manipulability of the lid 40 is enhanced. In addition, the lens hood receives no force in the circumferential direction and, hence, there is no possibility for the lens hood to come loose. According to the second embodiment, it is possible for the photographer to put two fingers into the lens hood 30 through the front opening, pinch the pair of pin shaft receiving lugs 51 from opposite sides, press them in opposite directions so that they undergo elastic deformation, remove the pin shafts 52 from within the pin shaft receiving slots 62 and detach the lid 40A from the lens hood 30. Therefore, if frequent use of the opening 35 is anticipated, the photographer may remove the lid 40A from the lens hood 30 and keep it in a non-obtrusive area.

FIG. 10 is a perspective view of a lens hood according to the third embodiment of the invention before it is assembled. FIG. 11*a* is a plan view and FIG. 11*b* is a partial cross section of the lens hood taken along its circumference. FIGS. 12*a* and 12*b* are longitudinal sections of the lens hood and the lid, respectively, taken along the axis of the lens barrel. As in the previous embodiments, the opening 35 which is rectangular in shape is cut in a selected area of the circumference of the lens hood 30, namely, in the peripheral surface of its top. The opening 35 has two side edges that run parallel to the optical axis; each side edge has an extended thick-walled rail defining portion 71 that projects radially inward of the lens hood 30 and which has a recessed guide rail 72 formed therein. An engagement projection 73 which projects radially outward is formed on the edge of the basal end of the opening 35 in substantially the center of its circumference and a contact projection 74 which projects radially inward is formed along the edge of the distal end of the opening. Two engagement portions 75 and 76 each having a wedge-shaped cross section and projecting radially inward are provided on the inner surface of the lens hood 30 in the area closer to the distal end than the opening 35. The first engagement portion 75 and the second engagement portion 76 are on opposite sides of the center of the opening 35 as taken in the direction of its circumference; the first engagement portion 75 is provided in a position nearer to the distal end of the opening 35 in the axial direction of the lens barrel and the second engagement portion 76 is provided further away from the distal end of the opening 35, or offset toward the distal end of the lens hood by a dimension almost equal to the axial length of the opening 35. The two engagement portions 75 and 76 have such wedge-shaped cross sections that the steep slope of one engagement portion faces away the steep slope of the other engagement portion.

The opening 35 is fitted with the lid 40B that can close it. Needless to say, the lid 40B is formed as a curved plate that makes up for a part of the circumference of the lens hood 30 so that it can close the opening 35 in the lens hood 30. The two side edges 81 of the lid 40B are so adapted that they engage the guide rails 72 on the lens hood 30 to be axially movable along them. In generally the central area of the edge of its distal end, the lid 40B has an engagement lug 82 as a rectangular plate that projects toward the distal end and a first engagement projection 83 and a second engagement projection 84, both having a wedge-shaped cross section, are formed on the surface of the engagement lug 82 as integral parts. The first engagement projection 83 and the second engagement projection 84 are on opposite sides of the center of the lid 40B as taken in the direction of its circumference; the ridge of one engagement projection is axially offset by a small distance from the ridge of the other engagement projection and the gentle slopes of the two engagement projections face in opposite directions. It should also be noted that the first and second engagement projections 83 and 84 are so positioned that they are opposed, in axial direction, to the first and second engagement portions 75 and 76, respectively, of the lens hood 30. On the top surface of the edge of its basal end, the lid 40B has a manipulating portion 85 projecting radially outward. It also has a contact step 86 in a position closer to its distal end. An engagement step 87 which engages the projection 73 is formed as a recess in the bottom surface at the edge of the lid 40B in generally the center of its circumference.

Figure 13A:
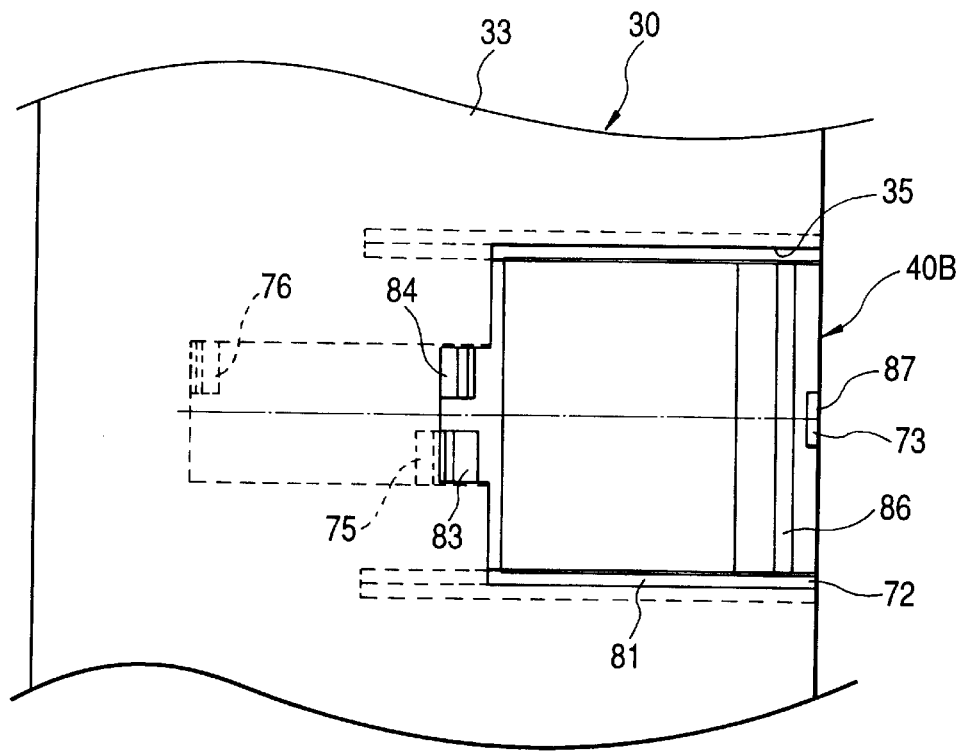
FIG. 13a is a plan view of the lens hood according to the third embodiment, with the opening closed.
Figure 13B:
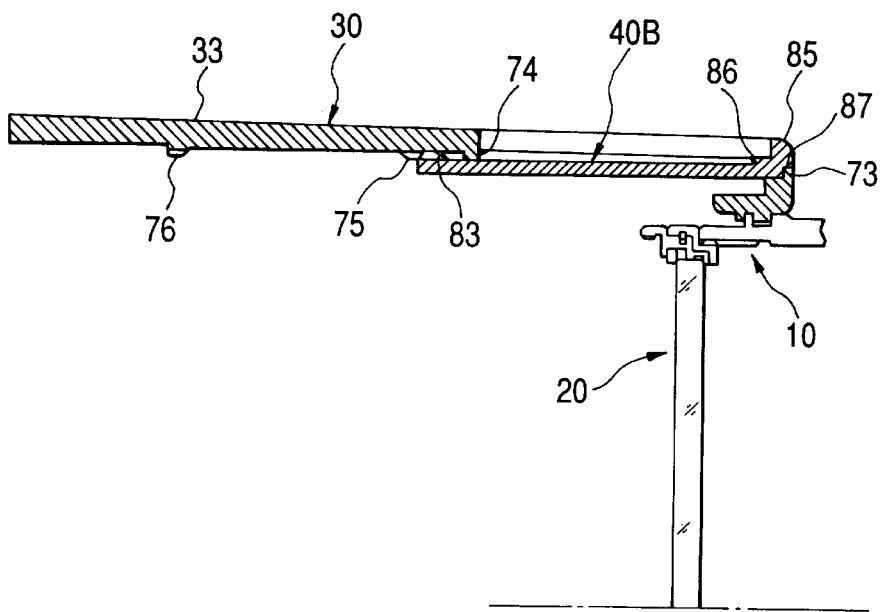
FIG. 13b is a longitudinal section of the lens hood according to the third embodiment, with the opening closed.

In its normal state, the lid 40B is fitted into the opening 35 in the lens hood 30 to close said opening as shown in FIG. 13*a* (plan view) and FIG. 13*b* (longitudinal section). To state more specifically, the two side edges 81 of the lid 40B are supported on the lens hood 30 by being fitted into the guide rails 72 running along the two lateral sides of the opening 35. The first engagement projection 83 is brought into contact with the first engagement portion 75 of the lens hood 30 whereas the engagement step 87 of the lid 40B engages the engagement projection 73 of the lens hood 30. As a result, the lid 40B is axially held between the first engagement portion 75 and the engagement projection 73 and will in no case detach from the opening 35.

Figure 14A:
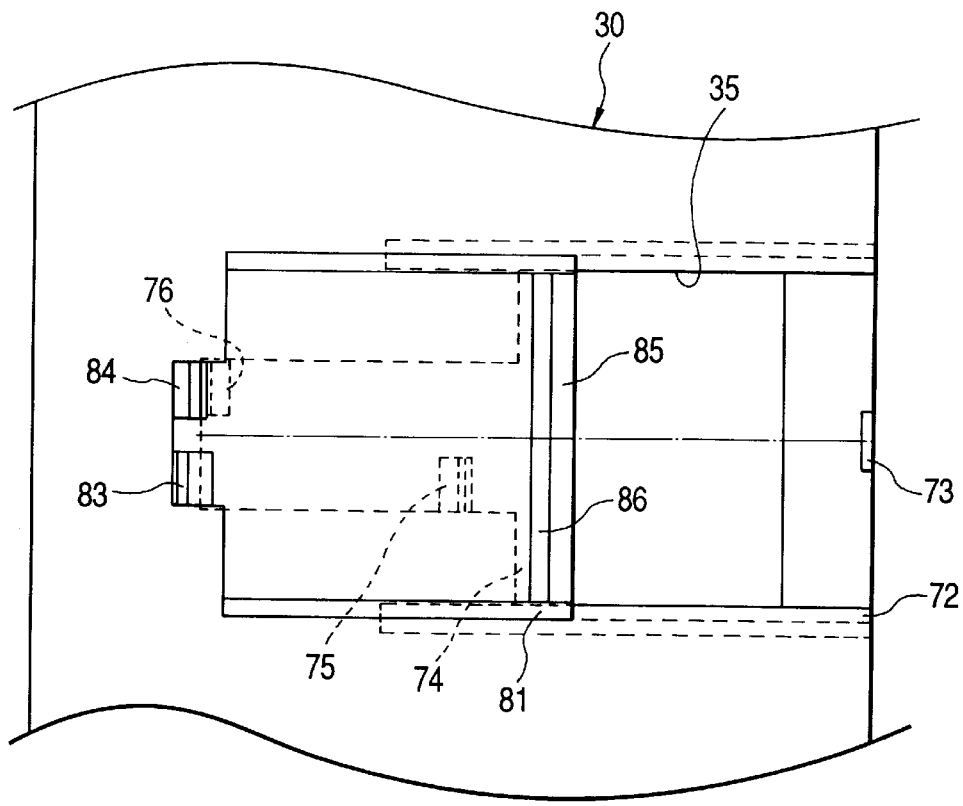
FIG. 14a is a plan view of the lens hood according to the third embodiment, with the opening made open.
Figure 14B:
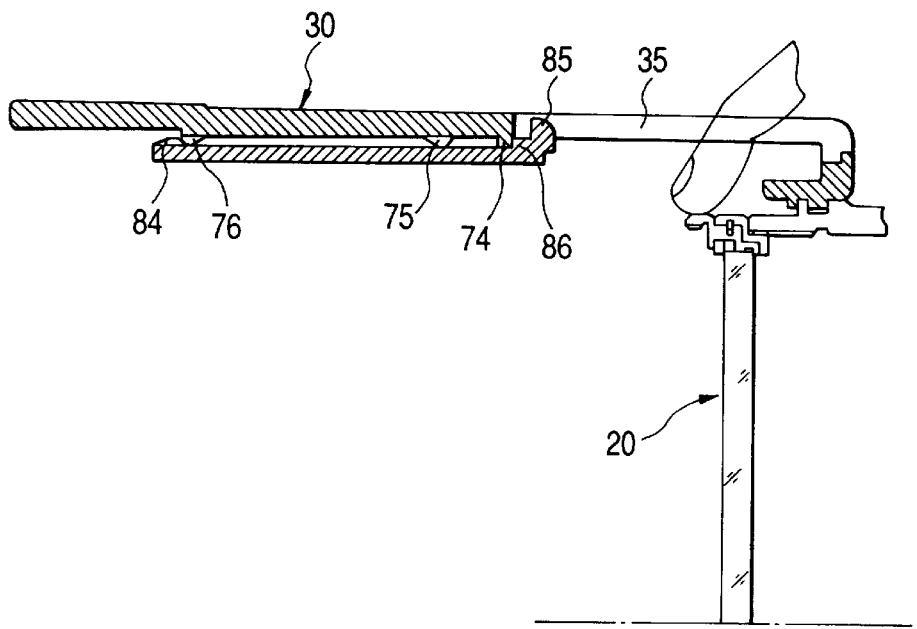
FIG. 14b is a longitudinal section of the same lens hood with the opening made open.
Figure 15:
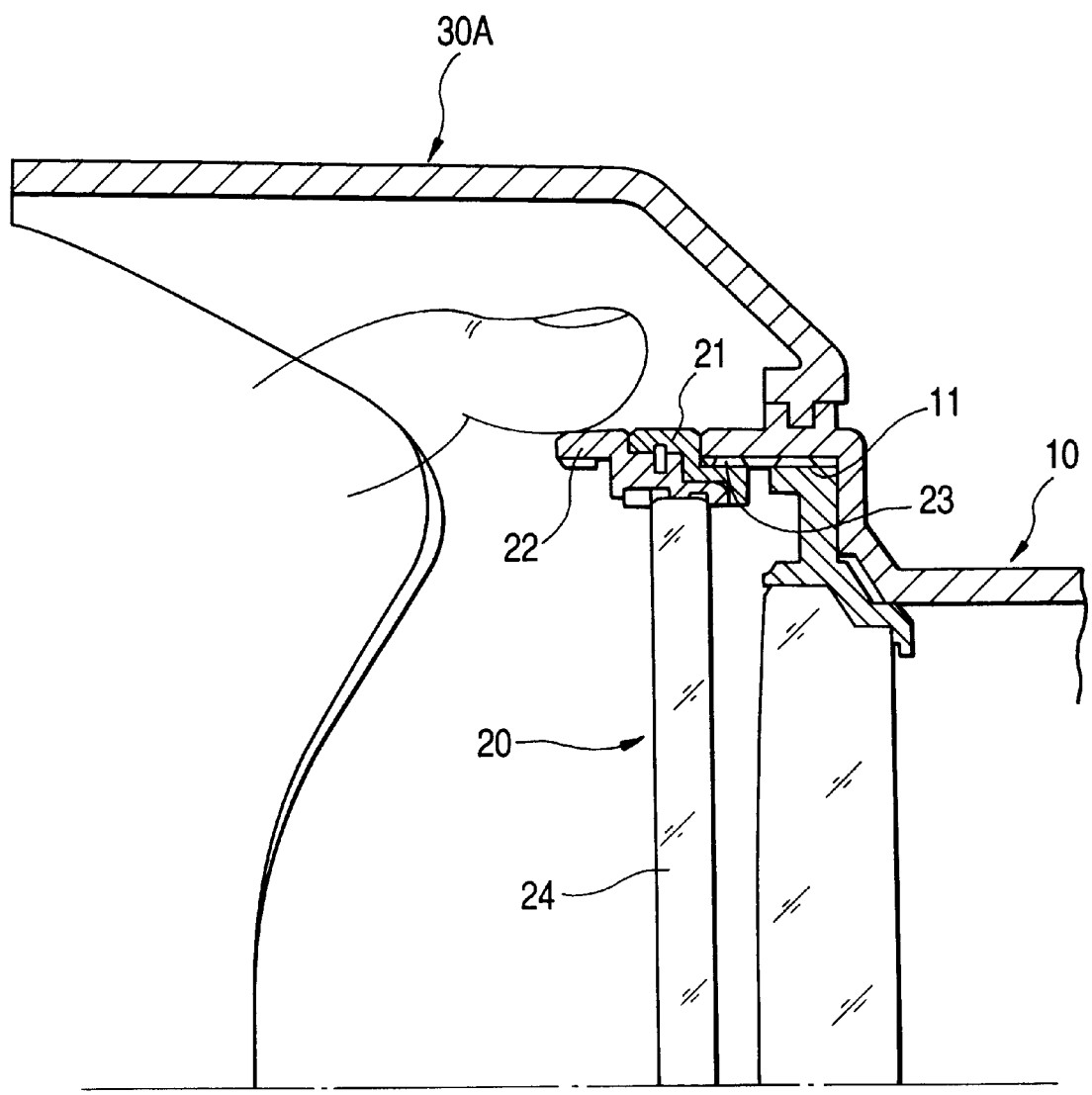
FIG. 15 is a partial section of a prior art lens hood.
Figure 16:
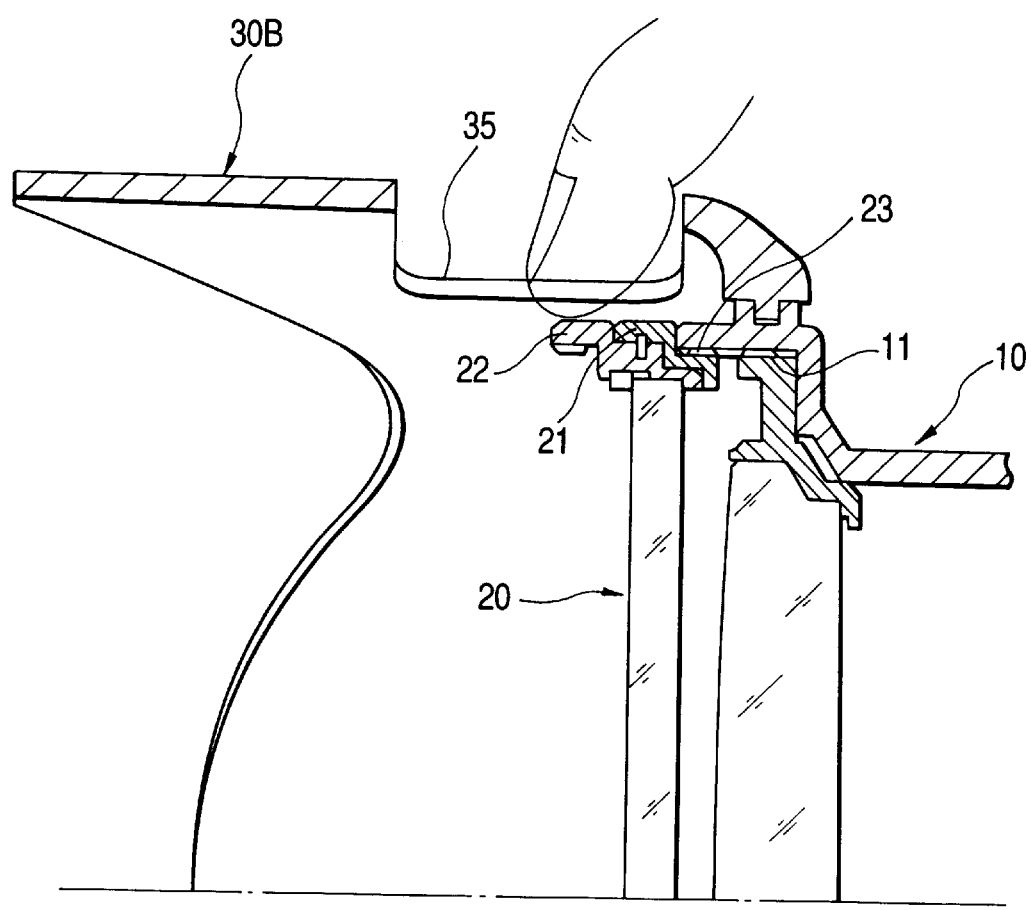
FIG. 16 is a partial section of another prior art lens hood.

Suppose here that the photographer is taking a picture by turning the polarizing filter 20 on the lens mount 20. First, as shown in FIG. 14*a* (plan view) and FIG. 14*b* (longitudinal section), he exerts a force that pushes the lid 40B toward the distal end, whereupon the first engagement projection 83 undergoes elastic deformation in a radially inward direction and rides over the first engagement portion 75, causing the lid 40B to slide along the guide rails 72 until it reaches the distal end of the opening 35. When the lid 40B has moved to a position beyond the edge of the distal end of the opening 35, the second engagement projection 84 ridges over the second engagement portion 76 and, at the same time, the contact step 86 on the edge of the basal end of the lid 40B contacts the contact projection 74 on the lens hood 30. As a result, the second engagement projection 84 and the contact step 86 hold the second engagement portion 76 and the contact projection 74 of the lens hood 30, causing the lid 40B to be held in that position. In this state, the opening 35 is kept open. To close the lid 40B, the photographer may simply put the finger on the manipulating portion 85 and apply a force acting toward the basal end of the lens hood, whereupon the second engagement projection 84 ridges over the second engagement portion 76, then the first engagement projection 83 ridges over the first engagement portion 75, causing the lid 40B to move toward the basal end until it closes the opening 35.

Thus, in the third embodiment of the invention, the opening 35 can be closed or made open by merely moving the lid 40B in the axial direction of the lens barrel. Even after the opening 35 has been rendered open, the lid 40B remains supported by the lens hood 30 in positions along its inner surface and there is no possibility for the loss of the lid 40*b*. To open the lid 40B, the photographer needs only to move it along the axis of the lens barrel; to close it, he needs only to move it in the reverse direction. A single finger suffices to open and close the lid 40B and the manipulability of the lid 40B is enhanced. In addition, the lens hood receives no force in the circumferential direction and, hence, there is no possibility for the lens hood to come loose.

In the foregoing embodiments, a polarizing filter is used to produce photographic effects. It should be noted that the present invention can effectively be applied to the case of using the aforementioned crossed filters and other filters that are mounted on the lens barrel and rotatably adjusted to produce enhanced photographic effects. Of course, the opening to be provided in the lens hood is by no means limited to the one which is in the circumferential position described in the foregoing embodiments. It also goes without saying that the lens hood of the present invention is applicable not only to photographic-cameras using silver salt films but also to digital cameras using CCD imagery.

As described above, the lens hood of the present invention is characterized in that the lid for making open or closing the opening in the lens hood is movable between one position and another relative to said lens hood and that said lid is so adapted that it closes said opening when it has moved to said one position while making said opening open when it has moved to said another position. One advantage of this design is that even when the lid is in a non-closing position, it is retained on the lens hood and there is no possibility of losing it. In the present invention, the lid may be so designed that it turns radially of the lens hood to either close the opening or make it open; alternatively, the lid may be so designed that it moves along the axis of the lens mount to either close the opening or make it open; according to either design, the photographer need use only one finger to manipulate the lid for opening or closing it. In addition to this ease with which the opening can be made open or closed, there is no possibility of the lens hood coming loose as a result of lid manipulation. Thus, the present invention provides a lens hood that allows for adjustment of parts on the lens barrel as the lens hood is mounted on the camera, which is available in a smaller size, which can be manipulated with ease and which eliminates the possibility of losing the lid.

What is claimed is:

1. A lens hood to be fitted on a lens mount of a camera in such a way as to surround the front end of a lens barrel, said lens hood having an opening made in at least a portion of its peripheral surface to help manipulate the component mounted at the front end of said lens barrel and a lid for closing said opening, said lid being formed as a separate entity from said lens hood and retained on said lens hood such that it is movable between one position and another relative to said lens hood, said lid being so adapted that it closes said opening when it has moved to said one position while making said opening open when it has moved to said another position.

2. The lens hood according to claim 1, wherein said lid is linked to said lens hood by means of a hinge structure that causes said lid to turn radially of said lens hood and said lid makes said opening open when it has been turned radially outward while closing said opening when it has been turned in a direction parallel to the peripheral surface of said lens hood.

3. The lens hood according to claim 2, wherein said hinge structure comprises a shaft element for providing a hinge link between said lid and said lens hood and an elastic means for urging said lid toward a direction in which it opens, said lid and said lens hood being supplied with retainer means for keeping said lid in said closed state.

4. The lens hood according to claim 2, wherein said hinge structure is composed of a pin shaft provided on either said lid or said lens hood and pin shaft receptacles provided on said lens hood or said lid, said lid and said lens hood being provided with engagement means for engaging said lid in said open state and said closed state, respectively.

5. The lens hood according to claim 1, wherein said lid is retained by rail structures capable of movement relative to said lens hood along the axis of the tube of said lens hood, and said lid, when it has moved to said one position, is in a position that closes said opening and, when it has moved to said another position, it is in a position adjacent said opening in the axial direction of the tube of said hood to make said opening open.

6. The lens hood according to claim 1, wherein the component to be mounted on said lens barrel is a rotatory effect filter such as a polarizing filter or crossed filters that are adjusted in the position of rotation about the optical axis to create different photographic effects and fingers of a photographer can be put into the lens hood through said opening to adjust the rotating position of said rotatory effect filter.

7. A lens hood adapted to be fitted onto a lens barrel of a camera, said lens hood comprising:
- a hollow lens hood body defining a first open end, an opposite, second open end, and an opening closer to said first open end than to said second open end; and
- a lid movably mounted on said hollow lens hood body and selectively opening and closing said opening.

8. The lens hood according to claim 1, wherein said lid is pivotably moved at least partially between said one position and said another position.

9. The lens hood according to claim 7, wherein said lid is pivotably mounted on said hollow lens hood body.

10. The lens hood according to claim 1, wherein said lid is linearly moved from said one position to said another position, said lid at said another position being held by said lens hood.

11. The lens hood according to claim 7, wherein said lid is slidably mounted on said hollow lens hood body, said lid being held by said hollow lens hood body when said lid opens said opening.

12. The lens hood according to claim 1, wherein said lid is retained on said lens hood using a combination of a pin and an elongating hole.

13. The lens hood according to claim 7, wherein said lid is mounted on said hollow lens hood body using a combination of a pin and an elongating hole.

14. The lens hood according to claim 1, wherein an exposed outer surface of said lid is flush with an exposed outer surface of said portion of the peripheral surface when said lid is located at said one position.

15. The lens hood according to claim 7, wherein an exposed outer surface of said lid is flush with an exposed outer surface of said hollow lens hood body where said opening is formed.

16. The lens hood according to claim 1, wherein said lid is biased in a direction toward said another position.

17. The lens hood according to claim 7, wherein said lid is biased in a direction to open said opening.

* * * * *